(12) United States Patent
Umeda et al.

(10) Patent No.: US 7,746,734 B2
(45) Date of Patent: Jun. 29, 2010

(54) OPTICAL DISK APPARATUS AND TRACKING METHOD

(75) Inventors: Mariko Umeda, Fuchu (JP); Hiroyuki Minemura, Kokubunji (JP); Motoyuki Suzuki, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 665 days.

(21) Appl. No.: 11/674,239

(22) Filed: Feb. 13, 2007

(65) Prior Publication Data

US 2007/0291600 A1 Dec. 20, 2007

(51) Int. Cl.
*G11B 7/00* (2006.01)
(52) U.S. Cl. .................................................. 369/44.28
(58) Field of Classification Search ............. 369/44.27, 369/44.26, 44.28, 44.29, 44.34, 44.41, 44.32
See application file for complete search history.

(56) References Cited

U.S. PATENT DOCUMENTS

| 5,303,216 | A | 4/1994 | Shinoda et al. |
| 5,383,169 | A | 1/1995 | Shinoda et al. |
| 5,434,834 | A | 7/1995 | Shinoda et al. |
| 2008/0159119 | A1* | 7/2008 | Minemura et al. .......... 369/277 |

FOREIGN PATENT DOCUMENTS

| JP | 5-54415 | | 3/1993 | |
| JP | 5-89494 | | 4/1993 | |
| JP | 7-320287 | | 12/1995 | |
| JP | 2002-279659 | | 9/2002 | |
| JP | 2003-317275 | * | 11/2003 | .............. 369/44.27 |

* cited by examiner

*Primary Examiner*—Nabil Z Hindi
(74) *Attorney, Agent, or Firm*—Antonelli, Terry, Stout & Kraus, LLP.

(57) ABSTRACT

A tracking offset is reduced. The effect of an SPP signal fluctuation is reduced by using a variable mixing ratio DPP method, and a residual tracking offset is minimized.

10 Claims, 17 Drawing Sheets

<DEFINITION OF EXTENDED DPP SIGNAL>
VDPP=MPP x α - (1-α)SPP,
OR
VDPP=MPP x α + (1-α)SPP,
WHERE
α IS MPP RATE.

CONVENTIONAL DPP IS VDPP WHEN α IS 0.5.

MPP

SPP

OFFSET MODEL FOR DUAL LAYER DISKS.

DPP SIGNAL OF RECORDED/
UN-RECORDED BOUNDARY AREA

FIG. 5

CAUSES FOR INTER-LAYER INTERFERENCES.

| CATEGORY | No. | CAUSES | REMARKS |
|---|---|---|---|
| OPTICAL HEAD | 1 | MISALIGNMENT OF THE DIFFRACTION GRATING | SUB-BEAM POSITION SHIFTS |
| | 2 | MISALIGNMENT OF LENSES AND PRISMS | UNBALANCE IN INTER-LAYER INTERFERENCE CAUSED BY WAVE ABERRATIONS |
| | 3 | MISALIGNMENT OF DETECTORS | UNBALANCE IN INTER-LAYER INTERFERENCE AT SUB-BEAM DETECTORS |
| | 4 | DETERIORATIONS WITH TEMPERATURE CHANGE | INCREASES IN MISALIGNMENTS AND UNBALANCES |
| | 5 | DETERIORATIONS WITH AGE | INCREASES IN MISALIGNMENTS AND UNBALANCES |
| DISK | 1 | TANGENTIAL TILT | UNBALANCE OF INTER-LAYER INTERFERENCES |
| | 2 | RADIAL TILT | UNBALANCE OF INTER-LAYER INTERFERENCES |
| | 3 | FRUSTRATION OF REFRACTIVE AND TRANSMISSIVITY OF LAYERS | UNBALANCE OF INTER-LAYER INTERFERENCES |
| | 4 | RECORDED DATA SITUATION | REFLECTION WAVE DIFFERENCE OF MAIN-BEAM AND SUB-BEAMS |
| | 5 | DECENTERING BETWEEN GROOVES OF THE LAYERS | REFLECTION WAVE DIFFERENCE OF MAIN-BEAM ON THE OTHER LAYER |
| SERVO CONTROL | 1 | TRACKING OFFSET | UNBALANCE IN INTER-LAYER INTERFERENCES CAUSED BY WAVE ABERRATIONS |

$D = P \times N / 2$
WHERE
DECENTERING: D
TRACK CROSS COUNT: N
GROOVE PITCH: P

OFFSET OF PUSH-PULL SIGNAL AS
A FUNCTION OF LENS SHIFT.

SIMULATED DPP SIGNALS WITH VARIABLE MIXING RATE α IN THE OPC AREA.

DEFINITIONS OF SINGULAR POINTS.

DESIGN OF α FOR READING.

DESIGN OF α FOR READING.

POINT: THREAD POSITION SHOULD BE CONTROLLED BY
THE RESIDUAL MPP SIGNAL WHITH IS SENSITIVE AGAINST
THE POSITION SHIFT OF THE OBJECTIVE LENS.

REFLECTIVITY AND PHASE OF
RANDOM PATTERN OF DVDs.

OPTICAL DISK APPARATUS AND TRACKING METHOD

CLAIM OF PRIORITY

The present application claims priority from Japanese application JP 2006-169016 filed on Jun. 19, 2006, the content of which is hereby incorporated by reference into this application.

FIELD OF THE INVENTION

The present invention relates to an optical disk apparatus, and more particularly, to a tracking signal detection system which enables a tracking control offset to be reduced when a differential push-pull (DPP) method is used.

BACKGROUND OF THE INVENTION

The DPP method in which the offset of a tracking control signal resulting from lens shifting can be effectively suppressed has been in wide use as a tracking system for optical disks. In the method disclosed in JP-A 54415/1993, three spots for tracking, i.e. a main spot, a first sub-spot, and a second sub-spot are positioned being shifted by half a track pitch each on a land/groove disk or a groove recording disk, and the offset of the tracking control signal caused by lens shifting is, in principle, canceled based on calculations made using three push-pull signals detected. When the DPP method is used in an isolated optical system, there are cases in which optical axis deviation causes the magnitudes of the three push-pull signals to vary. A method aimed at solving the problem is disclosed in JP-A No. 89494/1993. In the method, gain adjustment is made, in a mirror section, between the push-pull signal of a main spot and the push-pull signals of sub-spots. In the method disclosed in JP-A No. 279659/2002, to make up for a difference in reflectivity between land and groove, distinction is made between land and groove and between media, and the push-pull signal of either sub-spot is selected for use. In the method disclosed in JP-A No. 320287/1995, a function for selecting the three-spot method or the DPP method according to the medium type is used.

SUMMARY OF THE INVENTION

The emergence of dual-layer media has brought about a problem additional to those mentioned above. Namely, a tracking offset is caused by light which is reflected from other than a recording layer and leaks into the recording layer. Besides, many media manufacturers have started selling media varying in groove depth and other optical conditions, so that it has become necessary for optical disk drives to incorporate tracking control measures compatible with different media.

In connection with the problem of light leaking into a recording layer from a different layer when tracking control is performed on a multilayer medium by the DPP method, it is stated in JP-A No. 161295/1997 that the stray light from a different layer is DC light with no signal component. But, considering that the light leaking into a recording layer from a different layer is caused by interference between the recording layer and the different layer, such light cannot be uniformly removed.

FIGS. 2A and 2B are diagrams showing results of measuring push-pull signals during reproduction from a dual-layer disk. FIG. 2A is a diagram showing measurements of the push-pull signal of a main spot (hereinafter referred to as the "MPP" signal). FIG. 2B is a diagram showing measurements of the push-pull signal of a sub-spot (hereinafter referred to as the "SPP" signal). In a general DPP method, the MPP signal and the SPP signal are adjusted to be of a same polarity and to have a same amplitude, and the DPP signal is defined by the following equation.

$$DPP = MPP - SPP \quad (1)$$

Referring to FIGS. 2A and 2B, the MPP and SPP signals are adjusted to have an amplitude in a range of ±20 mV, but, whereas the amplitude of the MPP signal is stable mostly remaining within the range, the amplitude of the SPP signal shows large fluctuations. The fluctuations are reflected on the DPP signal according to the equation (1). Such fluctuations of the SPP signal are considered attributable to variations in interlayer spacing and interference between grooves of the two layers.

FIG. 3 is a schematic diagram showing the theory of interlayer crosstalk generation which is a factor in the SPP signal fluctuation on a dual-layer disk. An optical spot is focused on the first layer, and the light reflected from the first layer enters three light receiving areas of a photo-detector. At this time, the light not focused on the first layer is reflected from the second layer, so that the photo-detector detects the light leaking in from the second layer, too. Generally, the light quantity of a main spot is several times larger than the light quantity of a sub-spot, so that the main spot on a defocused layer interferes with the sub-spots on the recording layer causing the SPP signals to fluctuate.

In the case of single-layer disks, too, tracking by the DPP method in an optimum power control (OPC) area becomes unstable. FIG. 4 shows a simulated DPP signal in an OPC area. Compared with the DPP signal amplitude in an unrecorded area shown on the left in FIG. 4, the amplitude in a recorded area shown on the right is small. This is because the record marks formed in the recorded area lower the reflectivity of the area. Singular points, each marked with a circle in FIG. 4, appear in a border area between the recorded and unrecorded areas. This is attributable to imbalances between the MPP and SPP signals caused when the main spot and sub-spots scan areas with different reflectivities. Such singular points disable servo control, thereby causing a tracking error.

FIG. 5 gives an enumeration of conceivable causes for a tracking offset. The conceivable causes are as follows. Indications "(MPP)" and "(SPP)" denote whether an offset is caused to the main spot push-pull signal (MPP) or to the sub-spot push-pull signal (SPP).

1. Causes originating in optical system
  (1) Sub-beam displacement due to diffraction grating misalignment (SPP)
  (2) Collimation and beam shaping errors (MPP), (SPP)
  (3) Detector misalignment (MPP), (SPP)
  (4) Misalignment of laser wavelength and optical component wavelengths resulting from temperature changes (MPP), (SPP)
  (5) Misalignment of laser wavelength and optical component wavelengths resulting from aging (MPP), (SPP)

2. Causes originating in media
  (1) Optical axis displacement due to tangential tilt (MPP), (SPP)
  (2) Optical axis displacement due to radial tilt (MPP), (SPP)
  (3) Interlayer interference in dual-layer disk (SPP)
  (4) Change in reflected light quantity after recording (MPP), (SPP)
  (5) Intergroove interference in dual-layer disk (SPP)

3. Causes originating in servo system
  (1) Tracking error (MPP), (SPP)

The present invention is aimed at reducing an offset attributable to SPP signal fluctuation or an unbalanced state of the signal and stabilizing tracking control.

An offset caused by SPP signal fluctuation can be reduced by reducing the involvement of the SPP signal in the DPP signal. Lowering the ratio of the SPP signal, however, decreases the effect of offset suppression by lens shifting. A solution is to use a normal DPP signal when the SPP signal does not fluctuate and reduce the SPP signal when shifting of the lens is adequately small. Namely, the mixing ratio between the MPP and SPP signals is to be changed according to the condition. This method will, hereinafter, be referred to as the variable mixing ratio DPP (VDPP) method. The VDPP signal is defined by the following equation.

$$VDPP = \alpha MPP - (1-\alpha) SPP \quad (2)$$

where the coefficient $\alpha(0 \leq \alpha \leq 1)$ represents the MPP mixing ratio. When $\alpha=0.5$, VDPP is equivalent to DPP.

Setting $\alpha$ to be smaller than 0.5 to reduce the effect of SPP signal fluctuation decreases the effect of lens shifting to suppress a tracking offset. It is therefore necessary to learn a value of the mixing ratio $\alpha$ which minimizes the residual tracking offset. To determine an appropriate value of the mixing ratio $\alpha$ to be applied when using the variable mixing ratio DPP method, it is necessary to quantify (1) SPP signal fluctuation resulting from interlayer light leakage in a dual-layer disk, (2) tracking offset caused by lens shifting, and (3) residual tracking offset.

With reference to FIG. 6A showing MPP and SPP signals having undergone offset and gain adjustment, how to measure SPP signal fluctuation will be described. In this case, as the MPP signal is ideally the same as the SPP signal, it may be considered that the amount of SPP signal fluctuation equals the difference between the MPP and SPP signals. It is defined as follows.

$$\Delta_{SPP} = (SPP - MPP)/S_{MPP} \quad (3)$$

where $\Delta_{SPP}$ represents the amount of SPP signal fluctuation at a certain time, and $S_{MPP}$ represents the amplitude of the MPP signal.

Since $\Delta_{SPP}$ is a quantity which changes with time, it is necessary to measure a distribution of $\Delta_{SPP}$ values over a certain period of time (e.g. time taken per revolution of a disk). FIG. 6B shows a distribution of SPP signal fluctuation. From FIG. 6B, it is known that the peak of the distribution is not at a center of the distribution. To avoid being affected by SPP signal leakage resulting from interlayer crosstalk in a dual-layer disk, it can be said that adjusting the offset, not to a center of the distribution, but to an average between the maximum and minimum fluctuations as shown in FIG. 6B is effective. In the present case, the SPP signal fluctuation is about 60% of the MPP amplitude.

With reference to FIGS. 7A to 7C, how to measure the decentering of a disk will be described. FIG. 7A shows the MPP signal over a disk revolution period. The amount of decentering of the disk can be obtained based on the track cross count of the MPP signal and the groove pitch of the disk using the following equation.

$$D = P \times N/2 \quad (4)$$

where D represents a p-p value of decentering, P represents a track pitch (distance between grooves), and N represents a track cross count of the MPP signal.

The track cross count can be measured by reading, after digitization, for example, by an A/D converter, the MPP signal and processing it by software. In the case of a disk drive, the drive is desired to incorporate an LSI which has a measurement supporting function. FIG. 7B is a block diagram showing an example configuration of an LSI used for measuring the decentering of a disk. The push-pull signal (preferably an MPP signal) outputted from an optical head 110 undergoes offset and gain adjustment at an offset and gain adjustment circuit 10. At a zero-cross detector 20, the logic pulse level changes every time a zero point is crossed, and the pulse level edges are counted by a counter 21. A revolution gate control circuit 22 receives a synchronization pulse from a spindle motor 160 and generates a gate signal for a disk revolution period. The gate signal thus generated is used to control the measuring period of the counter 21. A CPU 140 calculates the amount of decentering of the disk using the above equation and based on the count given by the counter 21 and the groove pitch of the disk. As shown in FIG. 7C, the zero-cross detector 20 capable of track cross counting can be configured using a low-pass filter for noise elimination and a comparator.

FIG. 8 shows a relationship between the lens shift caused by disk decentering and the resultant offset of the MPP signal. The relationship is based on a simulation made by the linear diffraction method with the objective lens diameter set to 4 mm and the numeric aperture set to 0.85. The points shown beside the simulation curve in FIG. 8 represent measurements obtained by using a BD drive. As seen from FIG. 8, the amount of an MPP signal offset which results when decentering of the disk causes the objective lens to be moved in a radial direction of the disk and shifted from the center of the optical beam can be known either based on measurements or from a simulation.

FIG. 9 shows how a tracking control gain is adjusted. To perform tracking control appropriately, it is necessary to adjust the servo gain of the generated VDPP signal. Referring to FIG. 9, MPP and SPP signals outputted from the optical head 110 are inputted to a tracking error signal generator 30, causing a VDPP signal to be generated. A tracking servo control circuit includes a gain controller 41, a phase correction filter 42, and a current driver 43. It performs optical spot tracking control by controlling the current to flow through an objective lens actuator 114 included in the optical head 110. For gain adjustment, a sinusoidal signal generated at a disturbance signal source 44 is added to the VDPP signal, and the VDPP signal added to by the sinusoidal signal is inputted to the gain controller 41. At the same time, the suppression residual of the corresponding frequency is measured at the error detector 45. This makes it possible to adjust the gain setting of the gain controller 41 so as to achieve an appropriate degree of disturbance suppression.

FIG. 10 is a diagram showing an example configuration of a tracking error signal generator. The photo-detector 113 having eight divisions receive a main beam and sub-beams, and obtains an MPP signal 51 and an SPP signal 52 using a current-to-voltage conversion amplifier and a differential amplifier configured as shown in FIG. 10. The MPP signal is inputted to an offset adjustor 31 included in the tracking error signal generator 30. At the offset adjustor 31, the electrical offset, generated by the current-to-voltage conversion amplifier, of the MPP signal is corrected. Then, at the gain adjustor 33, the amplitude of the MPP signal is adjusted to a prescribed value. Similarly, the SPP signal passes through an offset adjustor 32 and a gain adjustor 34 to undergo offset and gain adjustment. An adder 35 adds the MPP signal and the SPP signal, and outputs a VDPP signal 53.

The mixing ratio $\alpha$ for the VDPP signal can be set by gain adjustment at the gain adjustors 33 and 34. Once the gains ($G^0_{MPP}$ and $G^0_{SPP}$) that equalize the amplitudes of the MPP and SPP signals are determined, the mixing ratio $\alpha$ can be set to a desired value thereafter. For example, the mixing ratio $\alpha$ can be set to 0.5 by setting the gains $G^0_{MPP}$ and $G^0_{SPP}$ at the gain adjustors 33 and 34. To set the mixing ratio $\alpha$ to a desired value, the following equation can be used.

$$(G_{MPP}, G_{SPP}) = (2\alpha G^0_{MPP}, 2(1-\alpha) G^0_{SPP}) \quad (5)$$

Now, the measurements required to optimize the mixing ratio $\alpha$ have been made, that is, the amounts of (1) SPP signal fluctuation, (2) disk decentering, and (3) servo suppression residual have been measured. These amounts are associated with three independent events. The amount of a total offset $\alpha_{tot}$ dependent on the three independent events combined is given by the following equation.

$$\alpha_{tot}^2 = \alpha_{SPP}^2 + \alpha_{LENS}^2 + \alpha_{SERVO}^2 \qquad (6)$$

where $\alpha_{SPP}$ represents an SPP signal fluctuation amount, $\alpha_{LENS}$ represents an amount of offset resulting from lens shifting, and $\alpha_{SERVO}$ represents an amount of servo suppression residual.

The amount of lens shifting equals the sum of the amount of disk decentering and the amount of tracking error of the thread motor that moves the optical head in the disk radial direction. For the amount of tracking error of the thread motor, the corresponding design value for the servo system can be used. In the case of the VDPP method, the amount of offset resulting from lens shifting can be uniquely determined based on the mixing ratio $\alpha$. Namely, with the offsets of the MPP and SPP signals being identical in amount and opposite to each other in sign (positive/negative), the offset is canceled when the DPP condition ($\alpha=0.5$) is met. Hence, the following equation is established.

$$\alpha_{LENS} = |\alpha - 0.5| \times \alpha^0_{LENS} \qquad (7)$$

where $\alpha^0_{LENS}$ represents the amount of an MPP signal offset, as shown in FIG. 8, resulting from lens shifting.

FIG. 1 is a diagram showing experiment results providing a design value of the mixing ratio $\alpha$. In this case, calculations were made based on a maximum lens shift of 100 μm. As shown in FIG. 1, the offset is minimum when the mixing ratio $\alpha$ is about 0.8. The drive used in the experiment had no previous record of successfully writing/reading information on/from an entire dual-layer disk. It was because of tracking control failure during recording. After the mixing ratio $\alpha$ was set to 0.67 based on the experiment results (not 0.8 because of limitation imposed by setting specifications for front end LSI), the drive became capable of writing/reading information on/from an entire dual-layer disk. This proves the effectiveness of the present method.

FIGS. 17A and 17B show results of optical constant identification performed for an optical simulation using seven DVD±R/RW disks purchased on the market. FIG. 17A shows calculated push-pull signal amplitudes. FIG. 17B shows calculated 8T signal modulation degrees. In each of FIGS. 17A and 17B, the horizontal axis represents mark phase and the vertical axis represents reflectivity ratio between mark and space.

The constants required for an optical simulation are two, i.e. recording mark reflectivity and phase. The two constants not yet known can be identified by measuring, in a recorded area, the push-pull modulation degree (push-pull signal amplitude/groove level) and the data modulation degree (data signal amplitude/groove level). To measure them, the mark width and the groove depth are required to be known. In the present case, the mark width was assumed to be a 3T length, i.e. 400 nm. The groove depth was estimated based on the push-pull modulation degree in an unrecorded area. Furthermore, considering that a main purpose of the simulation is to make calculations concerning the push-pull signal, the following approach was used. The frequency band of the servo system is on the 1-kHz order to be equivalent to about 1/1000 of the data system frequency band. Therefore, for push-pull signal calculations, it is necessary to obtain an average calculation result on recording data patterns of 1000 Tw or more. Such a method which involves large-scale calculations is not preferable. According to coding rules, the existence probability in a data signal is 1/2 for marks as well as for spaces. This is the same for DVDs and BDs. Therefore, it is good enough, for the purpose of making calculations about the push-pull signal in a recorded area, to determine the reflectivity and phase of a virtual data string (virtual random pattern) including 50% marks and 50% spaces in a mixed state and apply them to the calculations. The reflectivity of such a virtual random pattern can be determined by measurement as an average value of the reflectivities of the marks and spaces.

According to the results of measurement on the DVD±R/RW disks purchased on the market, the push-pull signal amplitude was about 0.25 and the 8T signal modulation degree was about 0.35. These values correspond to the 0.2-0.3 portion shown in FIG. 17A and the 0.3-0.45 portion shown in FIG. 17B. The portion marked RW in each of FIGS. 17A and 17B is where the 0.2-0.3 portion shown in FIG. 17A and the 0.3-0.45 portion shown in FIG. 17B overlap. Namely, the push-pull signal amplitudes and 8T signal modulation degrees falling in the portion marked RW agree with the measurement results. The mark phase and reflectivity values applied to the simulation fall in the portion marked RW. Similarly, the portion marked R in each of FIGS. 17A and 17B corresponds to the actual measurements obtained from the DVD±R/RW disks purchased on the market. The mark phase and reflectivity values applied to the simulation fall in the portion marked R.

In each of FIGS. 17A and 17B, the reflectivity is represented by the ratio between the reflectivity Rm of the recorded area and the reflectivity Rs of the unrecorded area. For both DVD±R and DVD±RW media, the reflectivity of the recorded area was observed to have decreased to about 0.5 to 0.6. As for the phase, whereas the phase of the DVD±RW media was approximately zero, the phase of the recorded area of DVD±R media was about $0.02\lambda$. Generally, the push-pull signal reduction caused by recording on a DVD±R disk is small. This is presumably because the phase of the recorded area is oriented in the direction to make the groove deeper (to make the push-pull signal greater).

Using the optical constants thus obtained, stabilization effects in an OPC area were optically simulated. FIG. 11A is a diagram showing results of simulation performed with a variable mixing ratio $\alpha$ in the OPC area. It is known from FIG. 11A that changing the signal waveform only at singular points in a border area between the recorded and unrecorded areas is possible by adjusting the mixing ratio $\alpha$. This is attributable to the fact that the two sub-beams are radially shifted by half a track pitch each from the main beam. In FIG. 11B, VA and VB each denote a singular point signal level, and ΔA and ΔB denote the differences between the VA and a corresponding normal signal level and between the VB and a corresponding normal signal level, respectively. FIG. 11C shows changes in VA and VB caused by changing the mixing ratio $\alpha$. When the VA and VB are equalized, the pull-in operation for reproduction is stabilized. In the present case, setting the mixing ratio $\alpha$ to about 0.2 stabilizes the pull-in operation. FIG. 11D shows changes in ΔA and ΔB caused by changing the mixing ratio $\alpha$. When the ΔA and ΔB both approach zero, the tracking operation during recording is stabilized. This indicates that, in the present case, setting the mixing ratio $\alpha$ to about 0.6 stabilizes the tracking operation.

The above simulation results relate to standard recording data collected using a disk drive. In cases where the recording power or the recording film sensitivity varies, the recoding mark width changes to produce results as shown by broken lines in FIGS. 11C and 11D. Particularly, in the case of an OPC area where the recording power is varied to learn an optimum recording power, mark width changes caused by recording power variations become remarkable causing the mixing ratio α to change. When applying the simulation results to an optical disk apparatus, it is necessary to take into account the range of changes in the mixing ratio α resulting from changes in the recording power. Still, it remains advisable to keep the mixing ratio α greater than 0.5 during recording so as to allow the optical spot to scan the track center and smaller than 0.5 during reproduction so as to give priority to tracking stability.

Using the optical disk apparatus and tracking method according to the present invention improves tracking control performance.

BRIEF DESCRIPTION OF THE DRAWINGS

FIG. 5 gives an enumeration of causes for a tracking offset.

DETAILED DESCRIPTION OF THE PREFERRED EMBODIMENT

The present invention will be described in detail with reference to a preferred embodiment.

Figure 1:
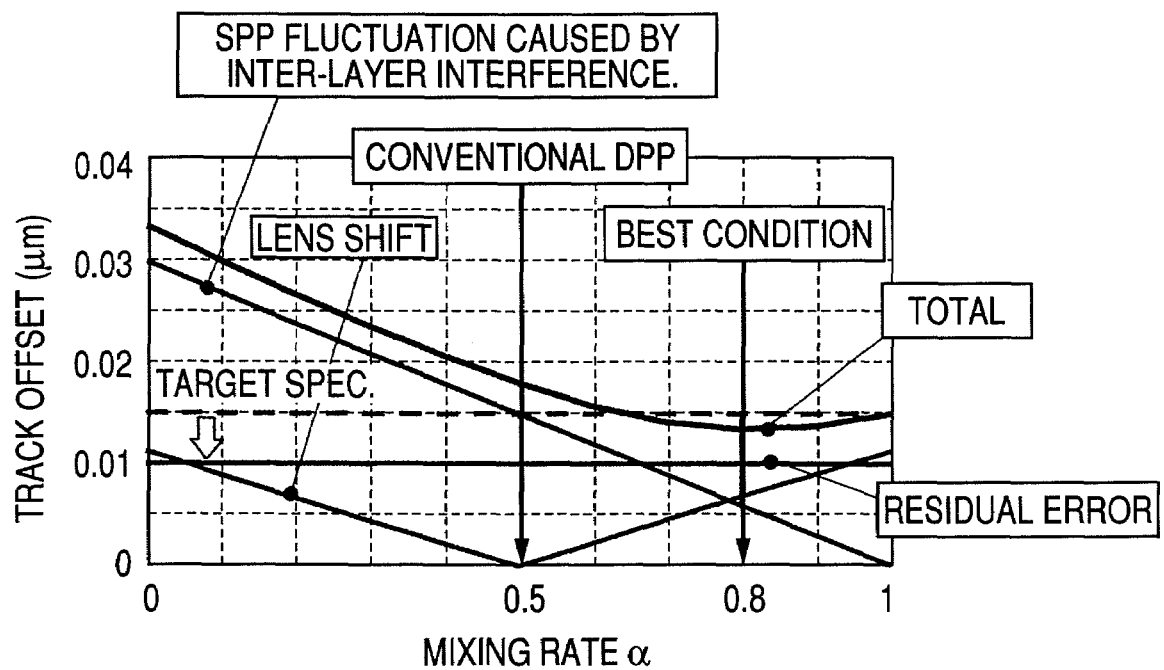
FIG. 1 is a diagram showing experiment results providing a design value of a mixing ratio α.
Figure 2A:
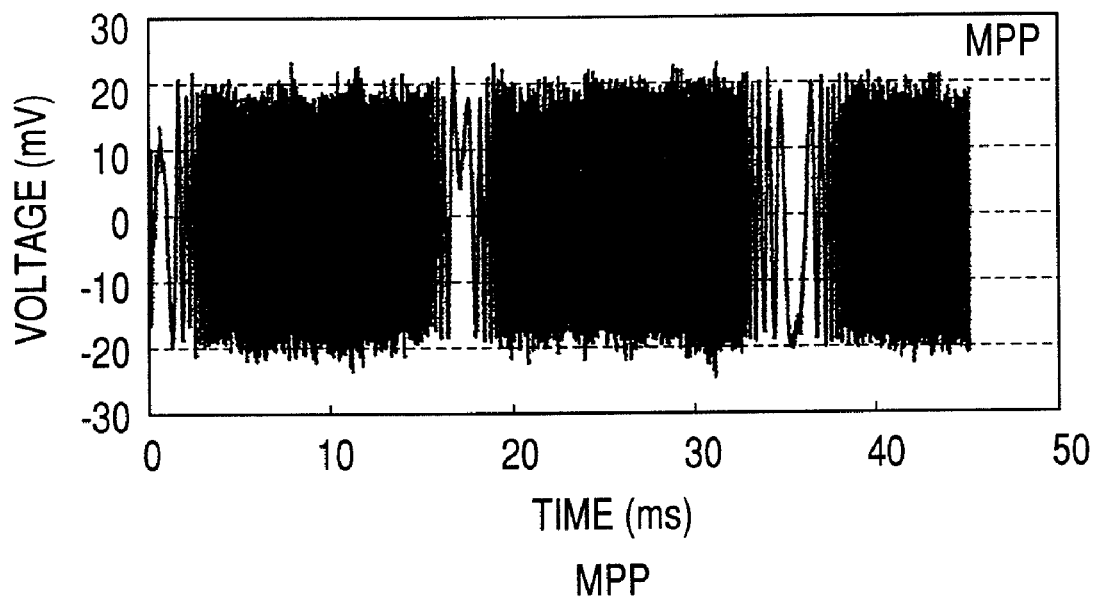
FIGS. 2A and 2B are diagrams showing results of measuring push-pull signals during reproduction from a dual-layer disk.
Figure 2B:
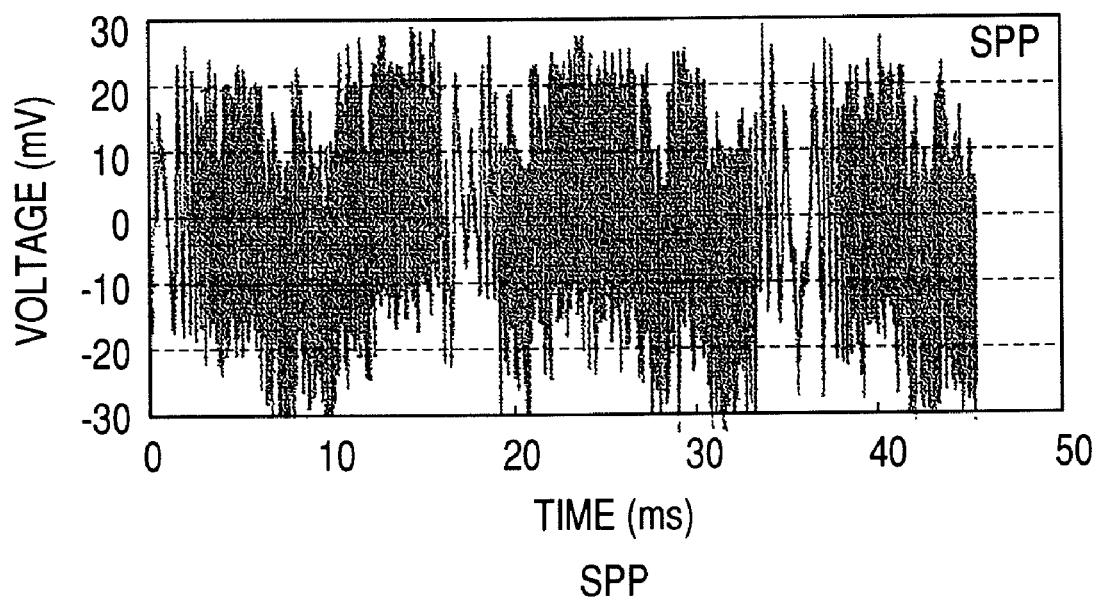
Figure 3:
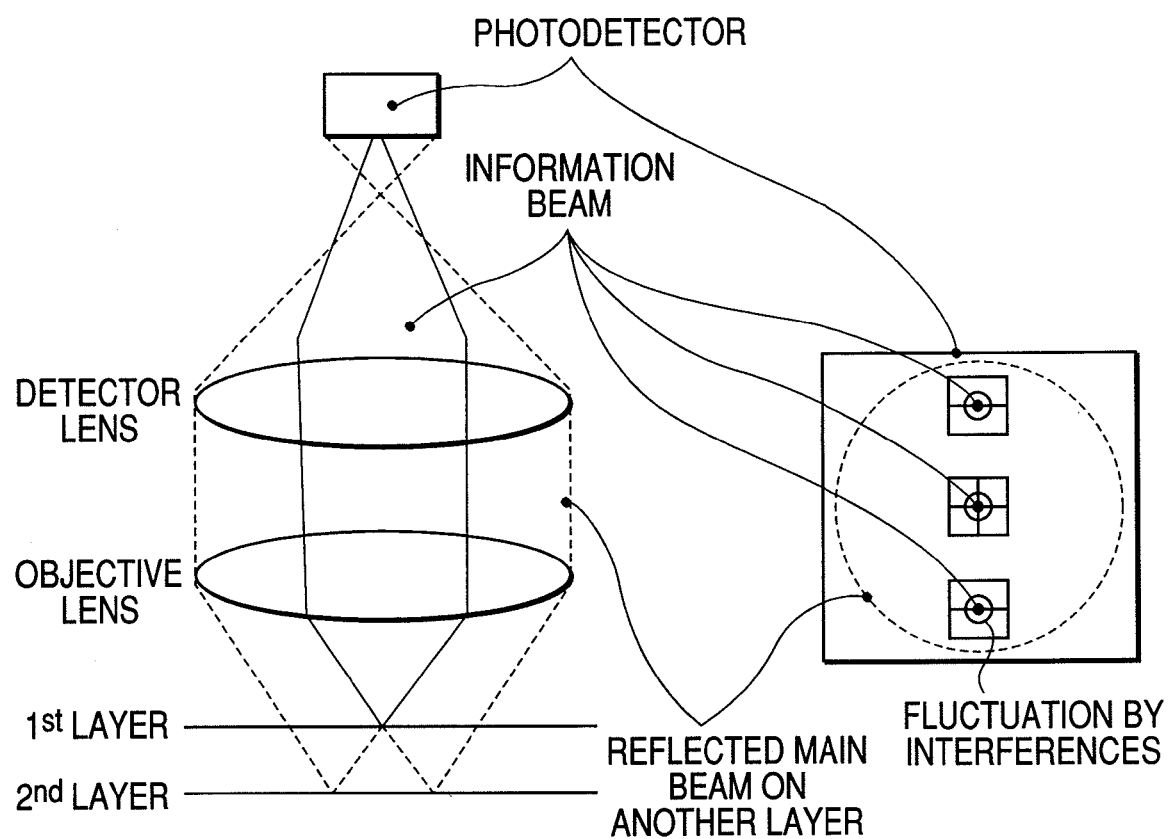
FIG. 3 is a schematic diagram showing the theory of interlayer crosstalk generation.
Figure 4:
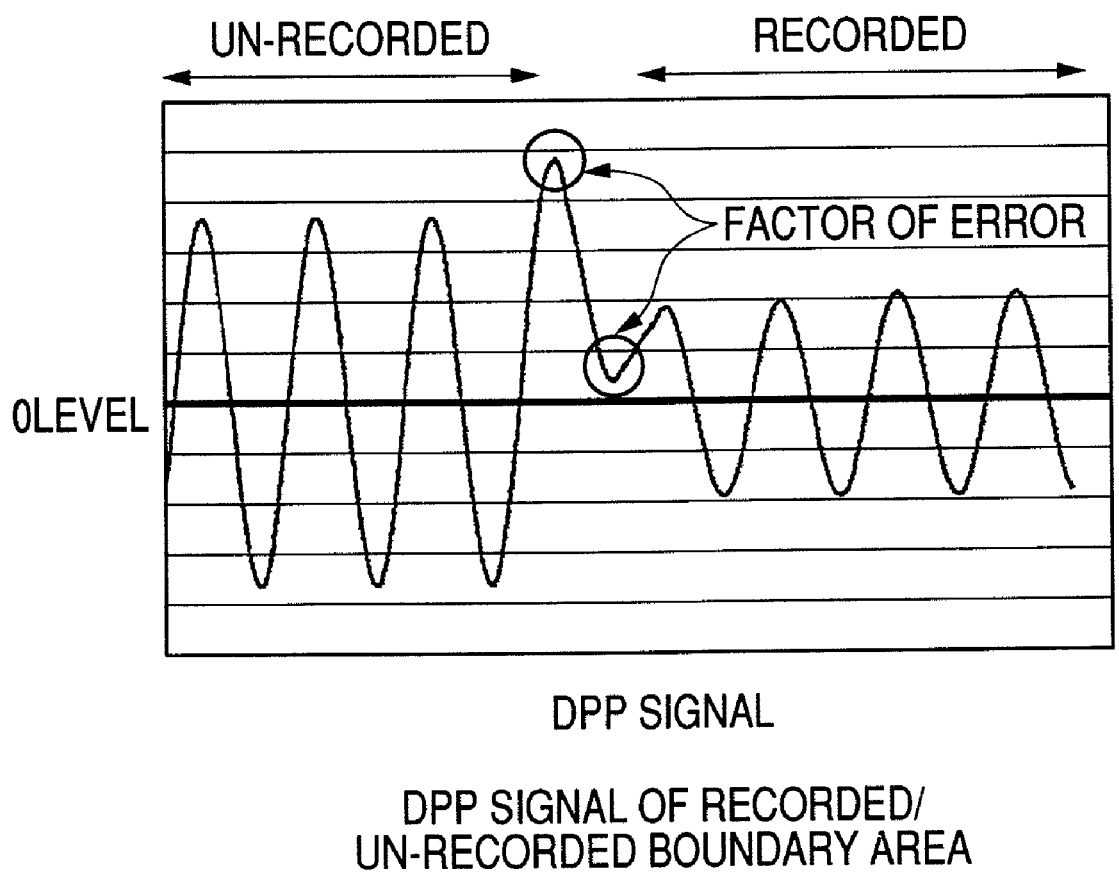
FIG. 4 is a diagram showing a DPP signal in an OPC area.
Figure 6A:
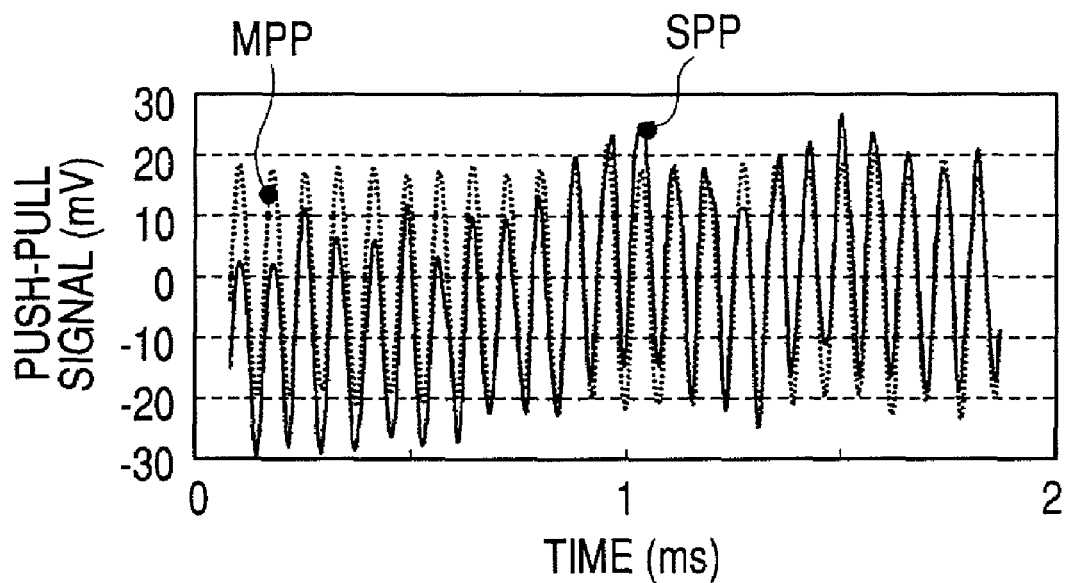
FIG. 6A is a diagram for explaining how to measure SPP signal fluctuation.
Figure 6B:
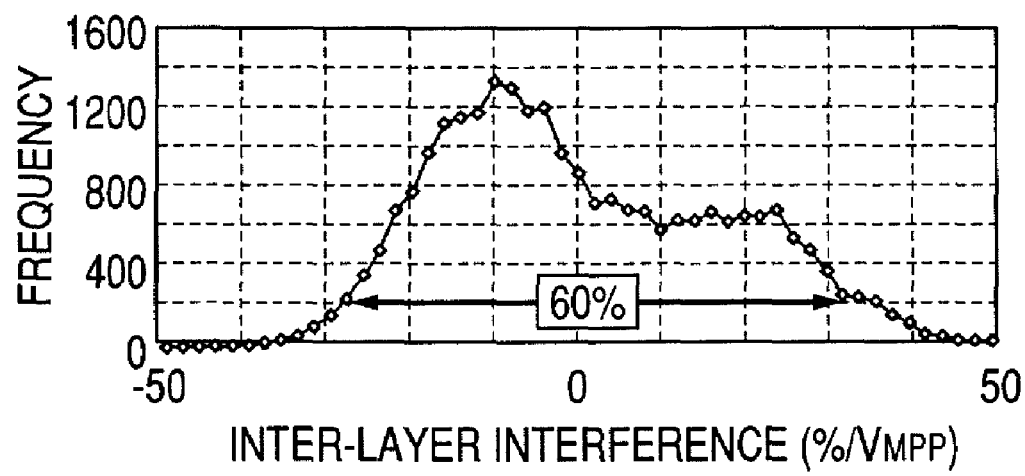
FIG. 6B is a diagram showing a distribution of SPP signal fluctuation.
Figure 7A:
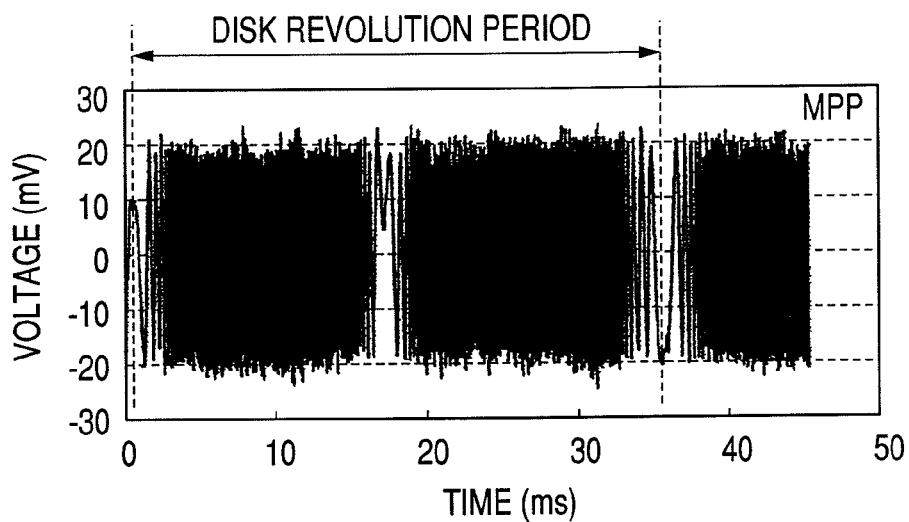
FIG. 7A is a diagram showing an MPP signal over a disk revolution period.
Figure 7B:
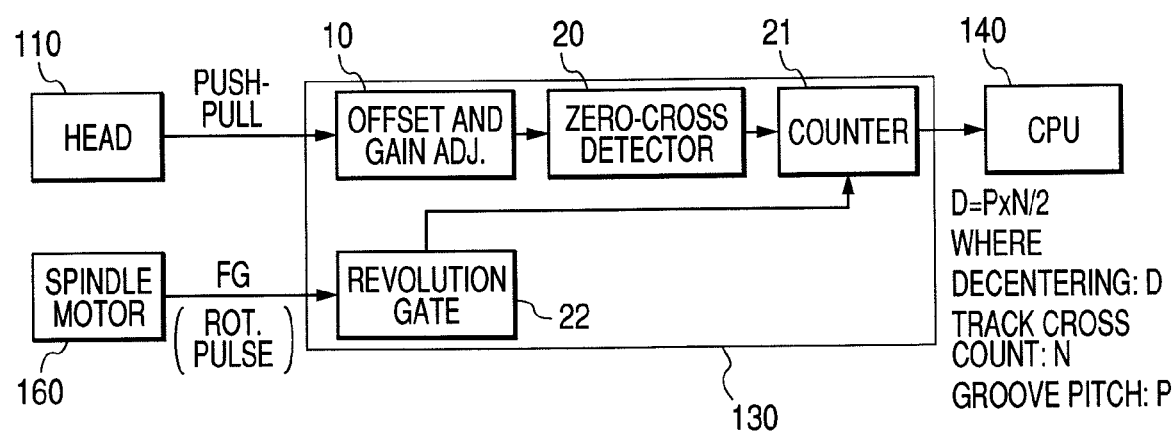
FIG. 7B is a block diagram showing an example configuration of an LSI used for measuring decentering of a disk.
Figure 7C:
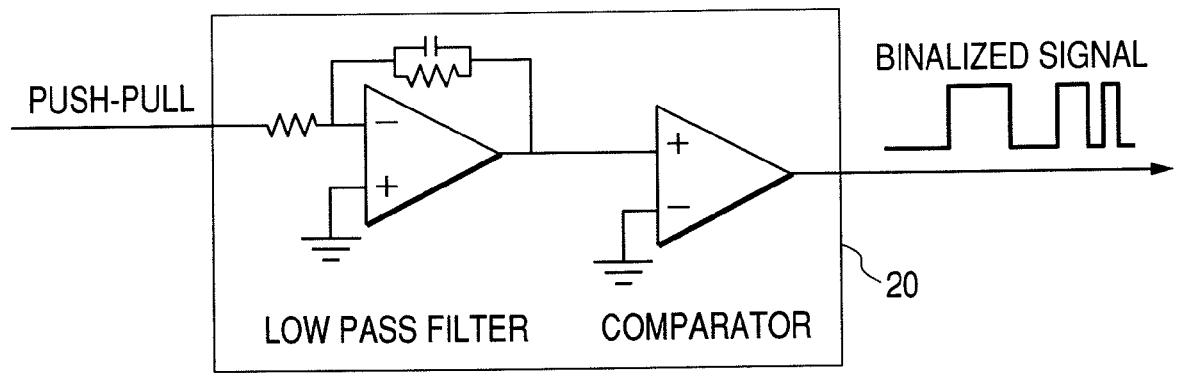
FIG. 7C is a diagram showing a configuration of a zero-cross detector.
Figure 8:
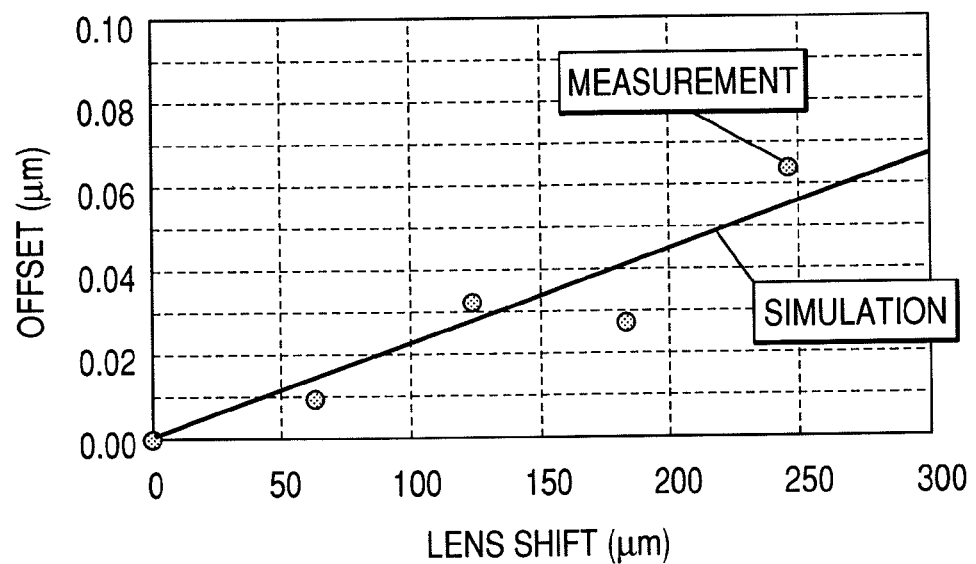
FIG. 8 is a diagram showing a relationship between a lens shift caused by disk decentering and an MPP signal.
Figure 9:
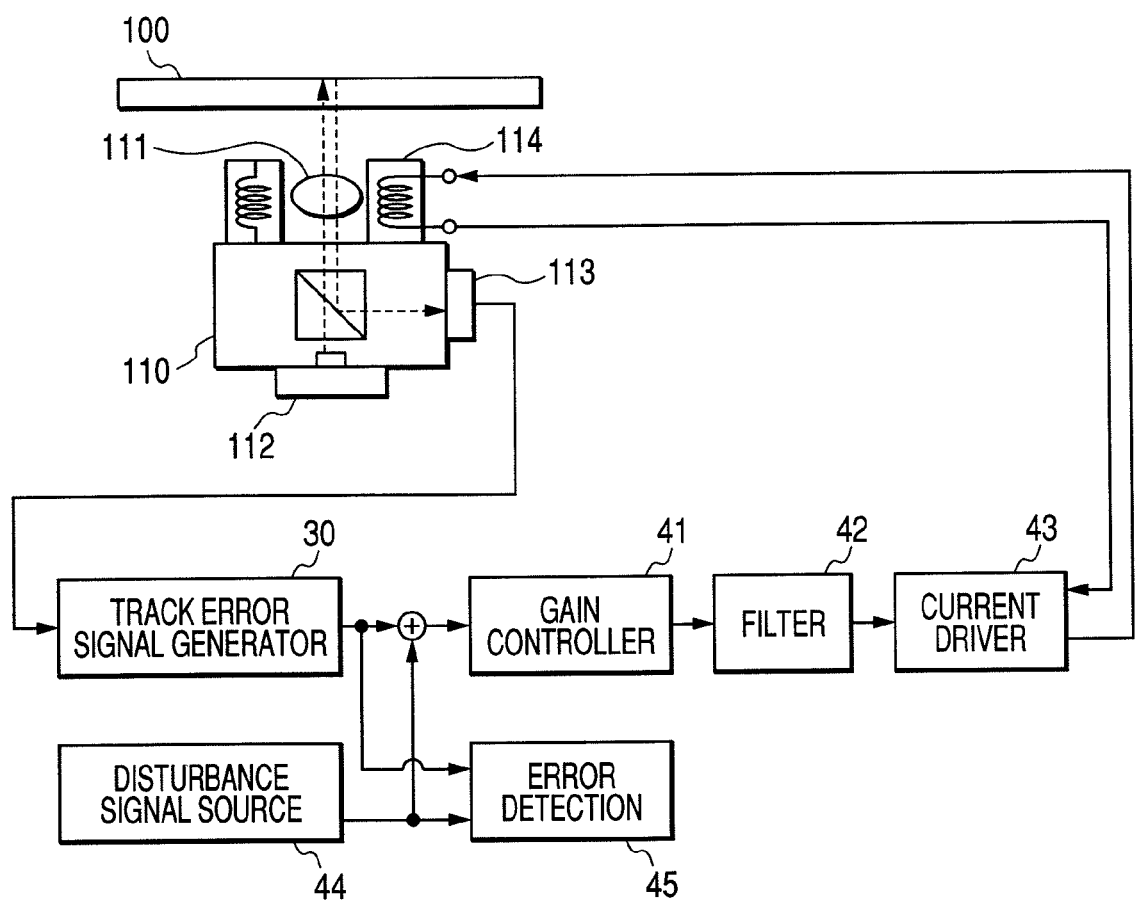
FIG. 9 is a diagram showing how to adjust a tracking control gain.
Figure 10:
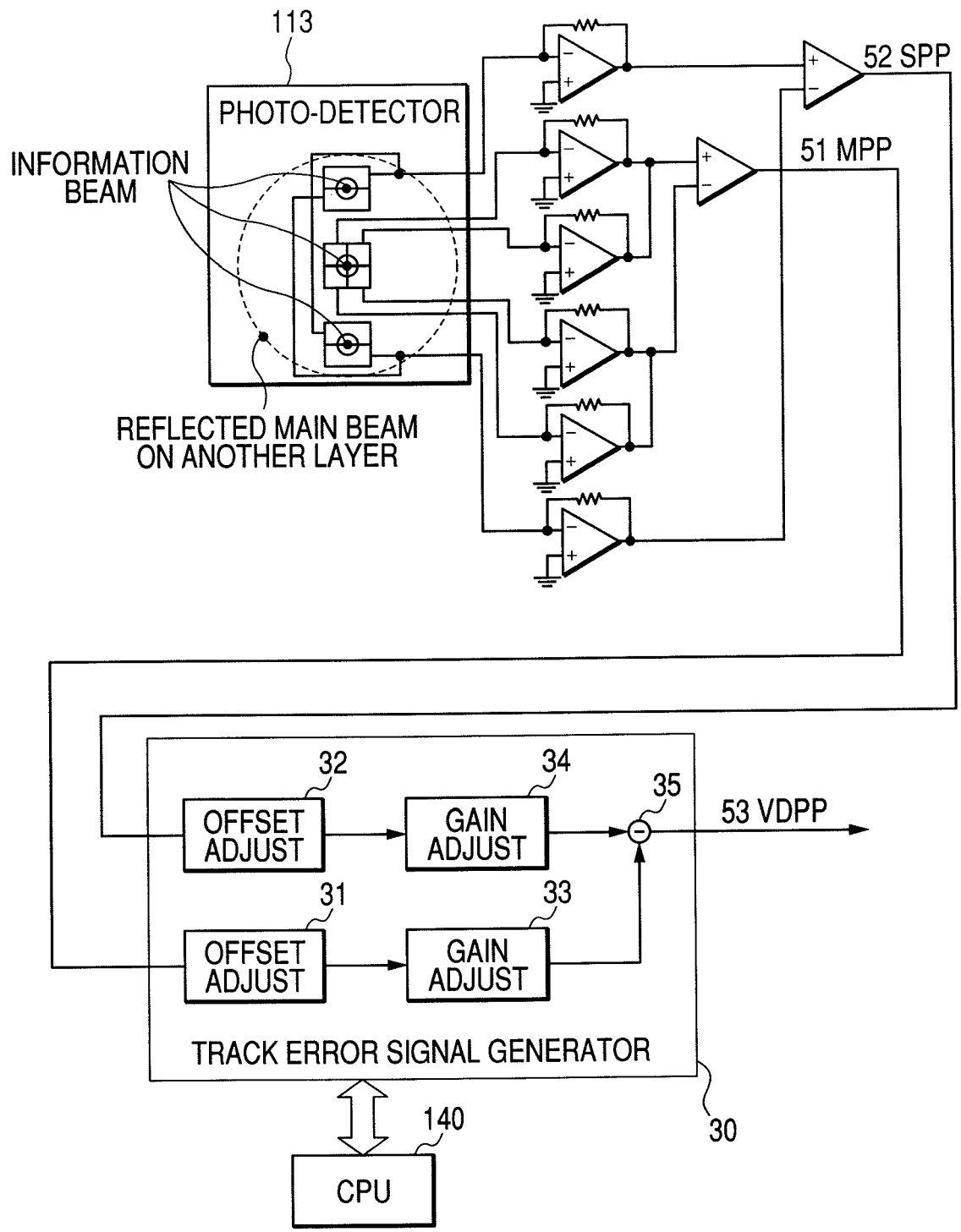
FIG. 10 is a diagram showing an example configuration of a tracking error signal generator.
Figure 11A:
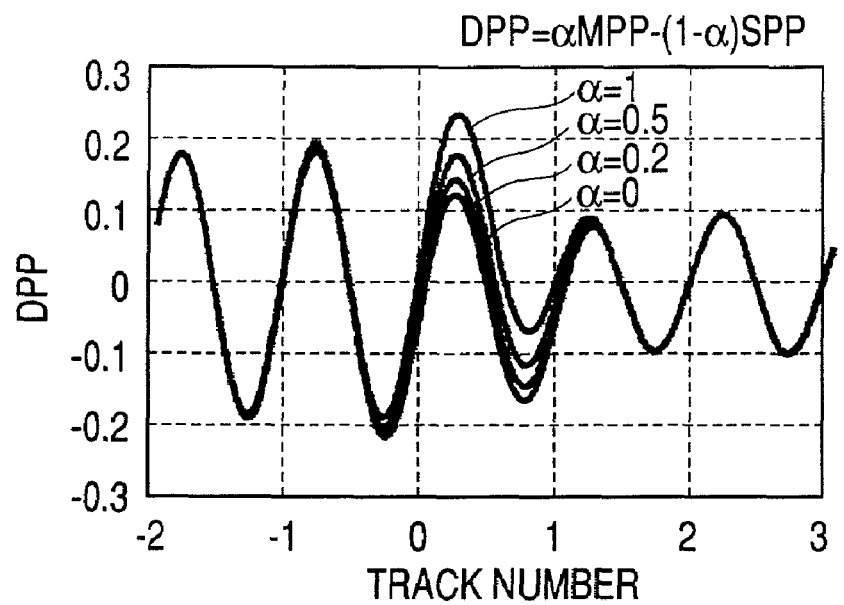
FIG. 11A is a diagram showing results of DPP signal simulation performed with a variable mixing ratio α in an OPC area.
Figure 11B:
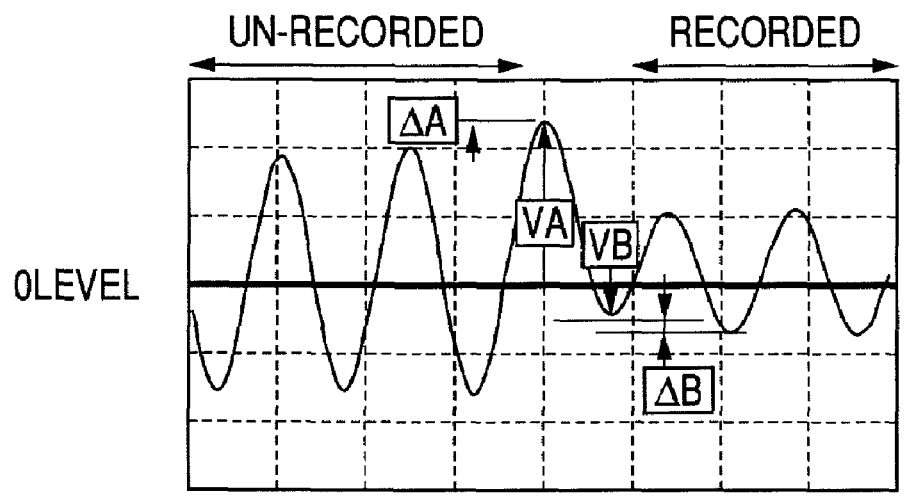
FIG. 11B is a diagram showing singular point definition.
Figure 11C:
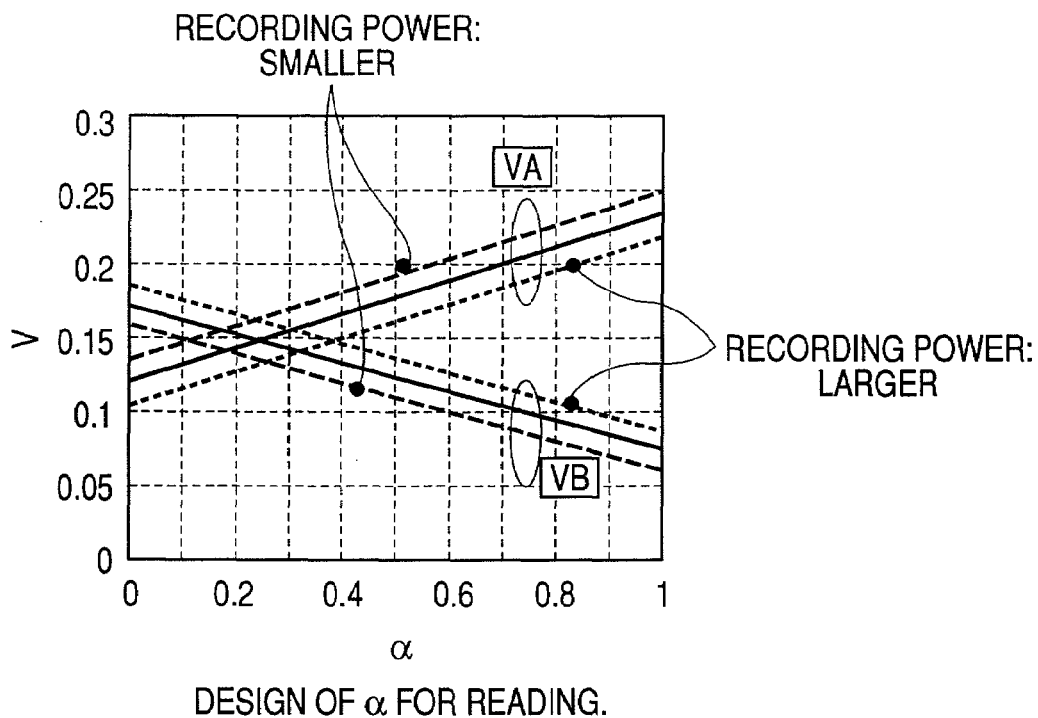
FIG. 11C is a diagram for explaining designing of a mixing ratio α for reproduction operation.
Figure 11D:
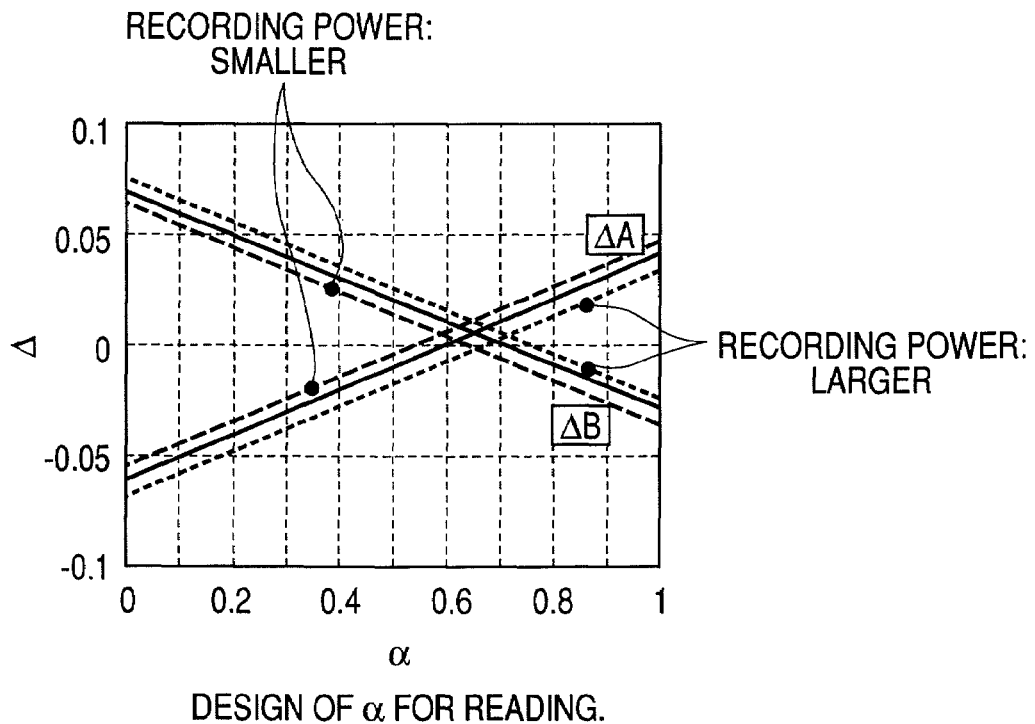
FIG. 11D is a diagram for explaining designing of a mixing ratio α for recording operation.
Figure 16:
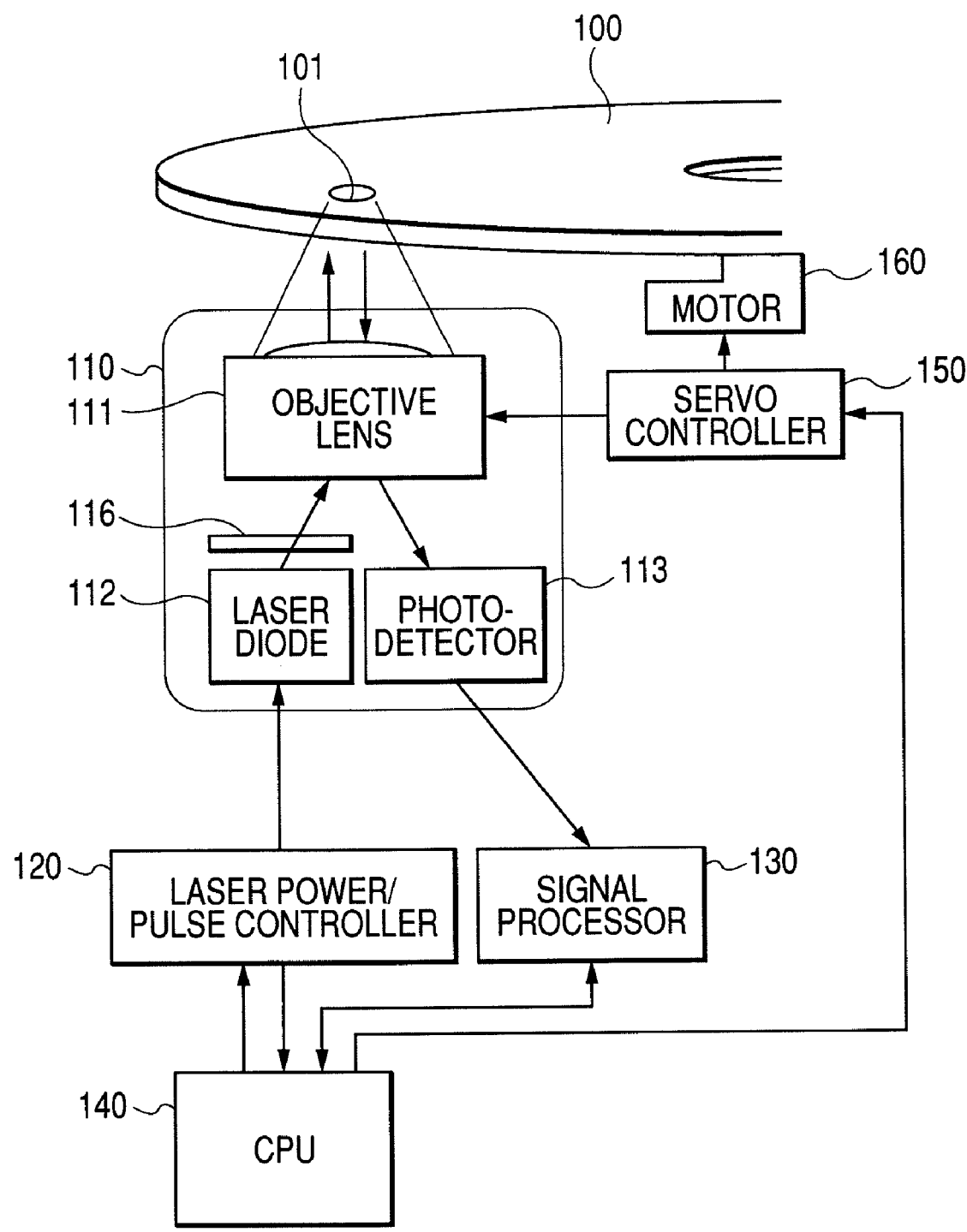
FIG. 16 is a block diagram showing an example configuration of an optical disk apparatus.
Figure 17A:
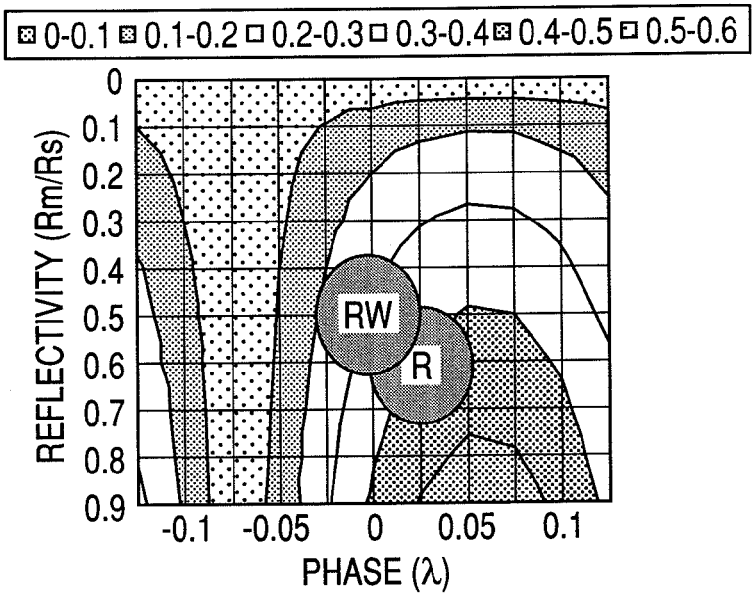
FIGS. 17A and 17B show results of optical constant identification performed for an optical simulation.
Figure 17B:
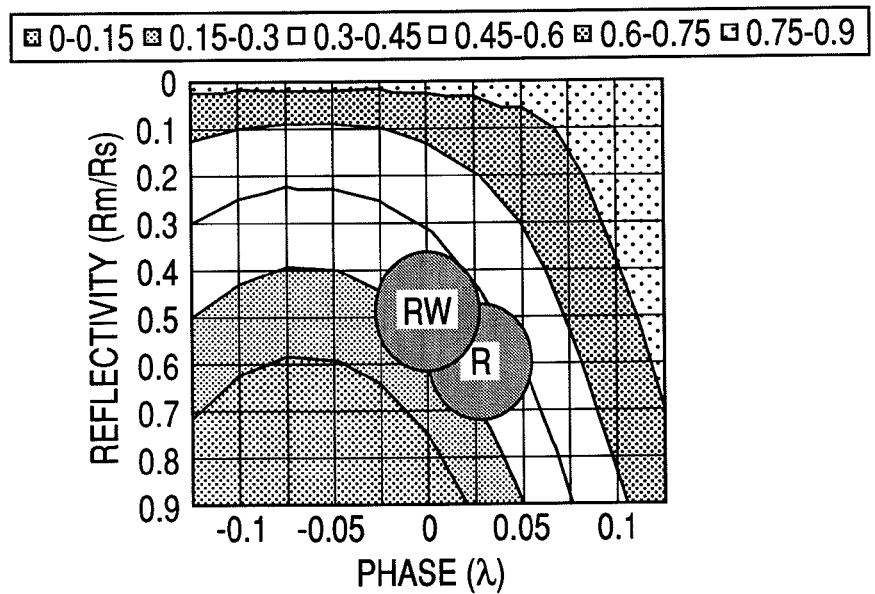

FIG. 16 is a block diagram showing an example configuration of an optical disk apparatus according to the present invention. An optical disk medium 100 is rotated by a spindle motor 160. For a read operation, an electric current controlled by a laser power/pulse controller 120 is applied to a laser diode 112 included in an optical head 110, and a laser beam is generated. At this time, the laser power/pulse controller 120 controls the electric current such that the laser beam has a light intensity prescribed by a CPU 140. The laser beam is split into a main beam and two sub-beams by a diffraction grating 116. The split beams are then converged by an objective lens 111 to form an optical spot 101 on the optical disk medium 100. The optical spot 101 includes a main spot formed by converging the main beam and two sub-spots formed by converting the two sub-beams. The two sub-spots are positioned, being shifted by half a track pitch each, on both sides of the main spot. The light reflected from the optical spot 101 is detected, via the objective lens 111, by a photo-detector 113. The photo-detector 113 includes, as shown in FIG. 10, plural photo-detecting elements.

A signal processor 130, while reproducing information recorded on the optical disk medium 100 using the signal detected by the optical head 110, generates an MPP signal and an SPP signal, from which it then generates a VDPP signal. A servo-controller 150 performs focusing and tracking. For tracking, the servo-controller 150 uses the VDPP signal. Focusing is performed based on a focus error signal generated from a main spot detection signal. A reproduction signal is generated from the main spot detection signal. For recording, the laser power/pulse controller 120 converts prescribed recording data into a prescribed recording pulse current, and performs control so that pulsed light is emitted from the laser diode 112. The circuit required for using the tracking method according to the present invention is incorporated in the signal processor 130. Processing for learning the mixing ratio α referred to in the foregoing is executed as a program stored in the CPU 140. The optical disk apparatus of the present invention can be provided based on the configuration described above.

Figure 12:
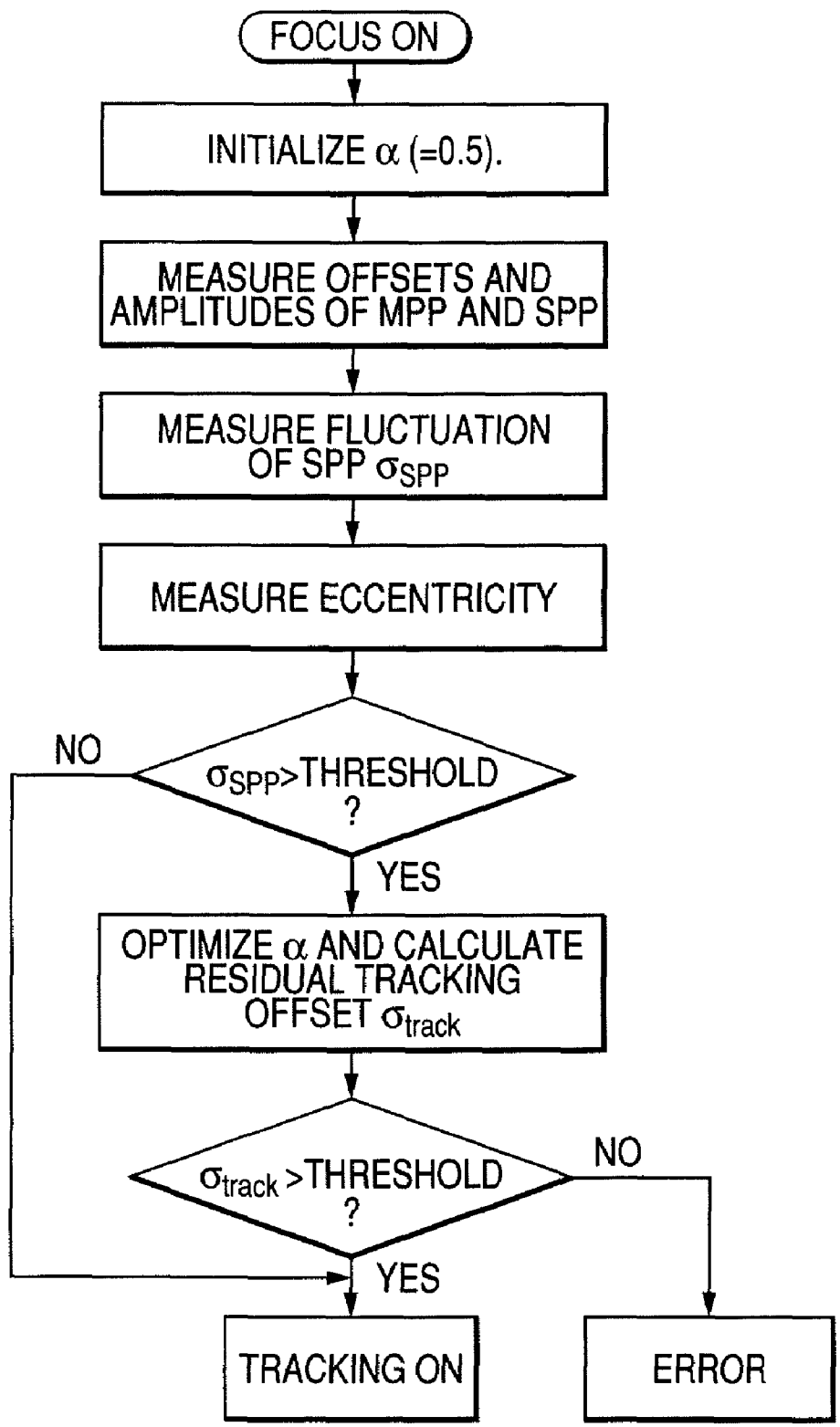
FIG. 12 is a flowchart of processing during reproduction from a dual-layer disk.

First, the tracking method according to the present invention will be described. FIG. 12 is a flowchart of the tracking method according to the present invention used in reading a dual-layer disk. The initial value of the mixing ratio α is 0.5. The MPP and SPP signals are measured in a focused state, and the fluctuation of the SPP signal is calculated. Shifting of the lens is then measured. When the SPP signal fluctuation is smaller than a threshold value, the mixing ratio α is left unchanged at 0.5, and tracking servo control is performed. When the SPP signal fluctuation is larger than the threshold value, an optimum value of the mixing ratio α is determined based on the amount of the offset due to disk decentering and the amount of the fluctuation, and the residual tracking offset is estimated. When the residual tracking offset becomes smaller than a threshold value, the tracking servo control is performed using the mixing ratio α thus determined. When the residual tracking offset is larger than the threshold value, the condition is regarded as an error.

Figure 13:
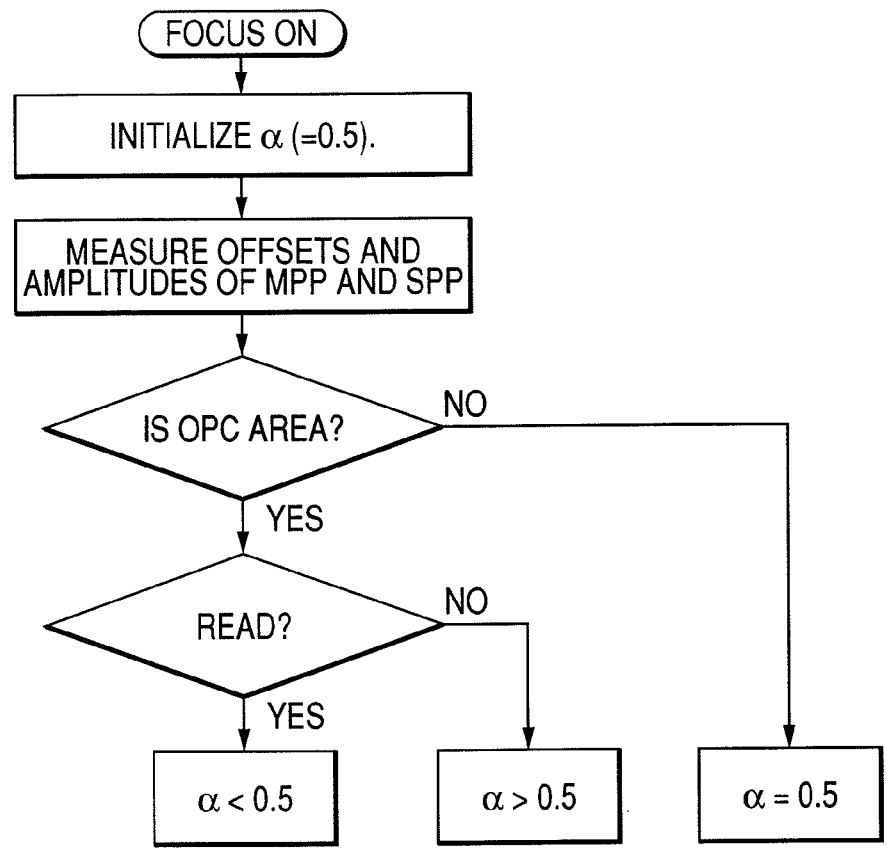
FIG. 13 is a flowchart of processing in an OPC area.

FIG. 13 is a flowchart of the tracking method according to the present invention performed in a single-layer OPC area. The process up to the step where the SPP signal fluctuation is calculated is the same as shown in FIG. 12. Subsequently, whether or not the current operation is performed in an OPC area is determined. When the current operation is being performed in other than an OPC area, the mixing ratio α is set to 0.5. When the current operation is being performed in an OPC area, the mixing ratio α is set to a value lower than 0.5, for example, 0.2 for reproduction or a value higher than 0.5, for example, 0.7 for recording. For the mixing ratio α, plural appropriate values may be stored in advance so that one of them may be selected for use according to the condition of operation.

Figure 14:
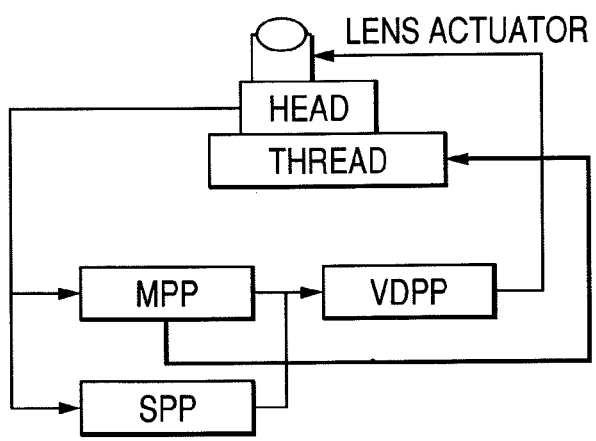
FIG. 14 is a block diagram of servo control.

FIG. 14 is a block diagram of preferred servo control for the optical disk apparatus according to the present invention. Referring to FIG. 14, control of the objective lens actuator by the VDPP signal is as described in the foregoing. FIG. 14 also shows a servo control loop for a thread motor. The objective lens is driven by the objective lens actuator and the optical head is driven by the thread motor both in a direction transversal to the track, namely, in a radial direction of the optical disk. If the thread motor is controlled so that the offset of the VDPP signal approaches zero, the signal offset relative to the lens shift will become smaller than appropriate, for example, in a case where the mixing ratio $\alpha$ is set to 0.5. Controlling the thread motor in such a way is not appropriate. To realize stable position control for the thread motor without depending on the value of the mixing ratio $\alpha$, it is appropriate to control the thread motor so that the offset of the MPP signal approaches zero. Namely, the thread servo control is to be performed using the MPP signal that is sensitive (showing a large offset) to disk decentering.

Figure 15:
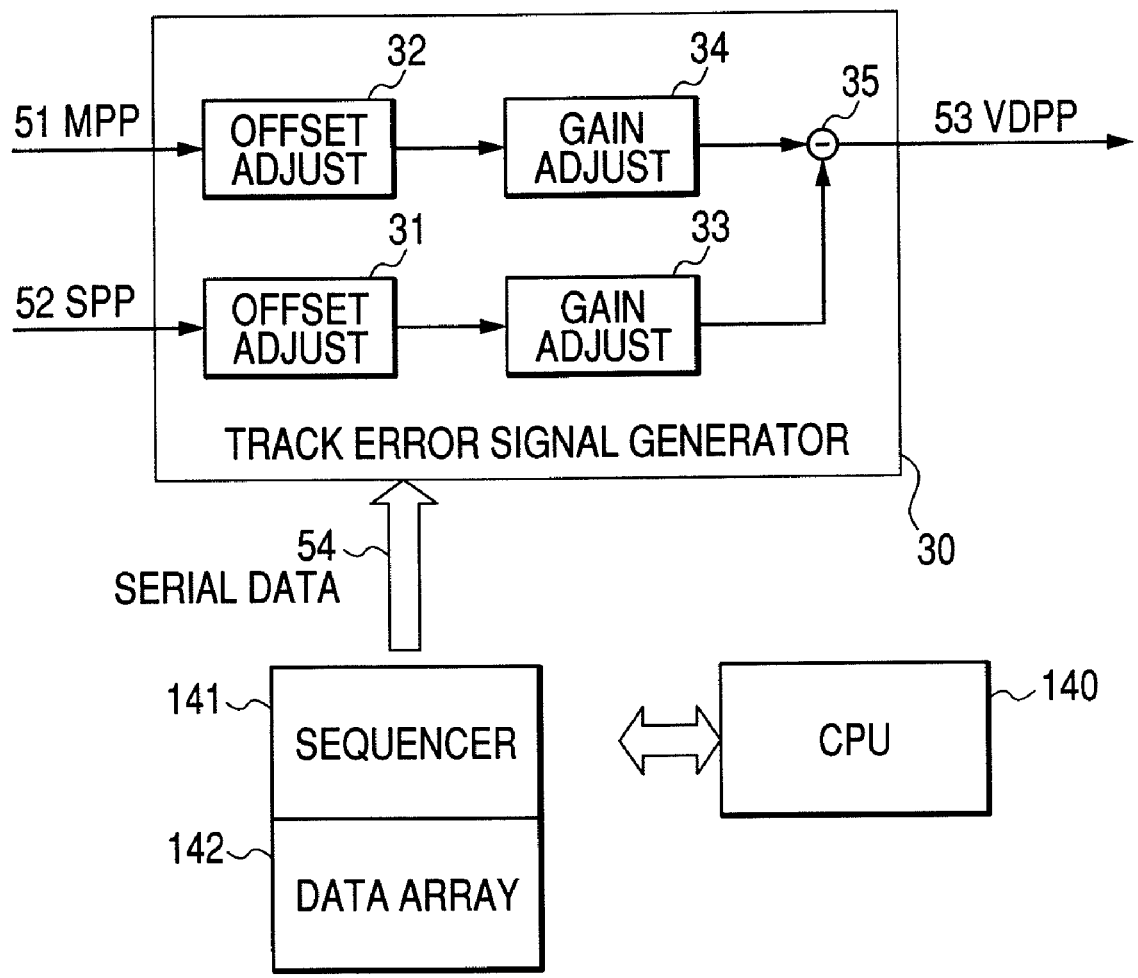
FIG. 15 is a diagram showing an example configuration of a sequencer for changing the mixing ratio α.

FIG. 15 is a diagram showing an example configuration of a sequencer for changing the mixing ratio $\alpha$ in the optical disk apparatus according to the present invention. According to the present invention, it is necessary to change the mixing ratio $\alpha$ between when accessing an OPC area and when recording data. Instantly changing the mixing ratio $\alpha$ makes tracking control unstable. Referring to FIG. 15, gain settings stored in a data array 142 by a sequencer 141 are automatically transferred to a tracking error signal generator 30 as serial data 54 at appropriate intervals. Changing the mixing ratio $\alpha$ in steps as in this case secures tracking control stability.

The present invention is applied to an optical disk apparatus in which tracking control is performed using three beams.

What is claimed is:

1. An optical disk apparatus, comprising:
an optical head including a light source, a beam splitter which splits a beam from the light source into a plurality of beams, an objective lens which converges the plurality of beams split by the beam splitter into a plurality of optical spots on an optical disk, a photo-detector which detects the plurality of optical spots reflected from the optical disk, and an actuator which drives the objective lens in a radial direction of the optical disk;
a thread motor which drives the optical head in the radial direction of the optical disk;
a unit which generates a plurality of tracking spot signals from detection signals generated by detecting the plurality of optical spots;
a unit which generates a tracking control signal for driving the actuator by mixing the plurality of tracking spot signals; and
a mixing ratio changing unit which changes a mixing ratio of the plurality of tracking spot signals;
wherein the mixing ratio changing unit determines the mixing ratio based on a measured amount of fluctuation of each of the tracking spot signals and a measured amount of decentering of the optical disk.

2. The optical disk apparatus according to claim 1; wherein a plurality of values of the mixing ratio are stored in advance, and the mixing ratio changing unit uses a value selected from the plurality of values stored in advance.

3. The optical disk apparatus according to claim 1; wherein the mixing ratio changing unit changes the mixing ratio in steps.

4. The optical disk apparatus according to claim 1; wherein the plurality of optical spots include a main spot and two sub-spots positioned, being shifted by half a track pitch each, on both sides of the main spot, and the thread motor is controlled using a tracking spot signal which is generated by a detection signal generated by detecting the main spot.

5. The optical disk apparatus according to claim 1:
wherein the plurality of optical spots include a main spot and two sub-spots positioned, being shifted by half a track pitch each, on both sides of the main spot;
wherein the unit that generates a plurality of tracking spot signals generates a main push-pull signal from a detection signal generated by detecting the main spot and a sub-push-pull signal from detection signals generated by detecting the sub-spots; and
wherein the mixing ratio changing unit changes the mixing ratio based on an initial state where gain correction has been made to equalize the main push-pull signal and the sub-push-pull signal in amplitude at a time of crossing a track of the optical disk.

6. A tracking method of an optical disk apparatus which irradiates an optical disk with a plurality of optical spots and generates a tracking signal from detection signals generated by detecting light reflected from the plurality of optical spots, the tracking method comprising the steps of:
generating a tracking signal with a variable mixing ratio by adjusting outputs of a plurality of tracking error signals, which are generated from detection signals generated by detecting the light reflected from the plurality of optical spots, and by performing addition or subtraction using the plurality of adjusted tracking error signals;
changing the mixing ratio according to an operating condition of the optical disk apparatus; and
controlling positions in a disk radial direction of the plurality of optical spots by using the tracking signal with a variable mixing ratio;
wherein the plurality of optical spots include a main spot and two sub-spots positioned, being shifted by half a track pitch each, on both sides of the main spot; and
wherein the step of changing the mixing ratio according to an operating condition of the optical disk apparatus includes
obtaining an amount of fluctuation of a second tracking error signal which is generated from detection signals generated by detecting the two sub-spots and an amount of shifting of an objective lens which converges the plurality of optical spots on the optical disk,
obtaining, when the amount of fluctuation is greater than a predetermined threshold value, an amount of offset of the second tracking error signal resulting from the shifting of the objective lens, and
obtaining the mixing ratio based on the amount of offset and the amount of fluctuation.

7. The tracking method according to claim 6: wherein a plurality of values of the mixing ratio are stored in advance, and a value selected, according to an operating condition of the optical disk apparatus, from the plurality of values stored in advance is used.

8. The tracking method according to claim 6:
wherein the plurality of optical spots include a main spot and two sub-spots positioned, being shifted by half a track pitch each, on both sides of the main spot; and
wherein the mixing ratio is set such that, when the optical spots are engaged in reproduction operation in an OPC area, a ratio of a tracking error signal which is generated from detection signals generated by detecting the two sub-spots increases, and such that, when the optical spots are engaged in recording operation in the OPC area, s ratio of a tracking error signal which is generated from a detection signal generated by detecting the main spot increases.

9. A tracking method of an optical disk apparatus which irradiates an optical disk with a plurality of optical spots and generates a tracking signal from detection signals generated by detecting light reflected from the plurality of optical spots, the tracking method comprising the steps of:
  generating a tracking signal with a variable mixing ratio by adjusting outputs of a plurality of tracking error signals, which are generated from detection signals generated by detecting the light reflected from the plurality of optical spots, and by performing addition or subtraction using the plurality of adjusted tracking error signals;
  changing the mixing ratio according to an operating condition of the optical disk apparatus; and
  controlling positions in a disk radial direction of the plurality of optical spots by using the tracking signal with a variable mixing ratio;
  wherein the mixing ratio is changed in steps.

10. The tracking method according to claim 6:
  wherein the plurality of optical spots include a main spot and two sub-spots positioned, being shifted by half a track pitch each, on both sides of the main spot; and
  wherein the step of generating a tracking signal with a variable mixing ratio includes
    generating a main push-pull signal from a detection signal generated by detecting light reflected from the main spot and a sub-push-pull signal from detection signals generated by detecting light reflected from the sub-spots; and
    performing gain adjustment to generate an initial state where the main push-pull signal and the sub-push-pull signal have an equal amplitude at a time of crossing a track of the optical disk.

* * * * *